Nov. 29, 1966    H. C. RHODES    3,288,287
SIFTER AND LIFTER FOR FLOUR AND THE LIKE
Filed Sept. 10, 1963    2 Sheets-Sheet 1
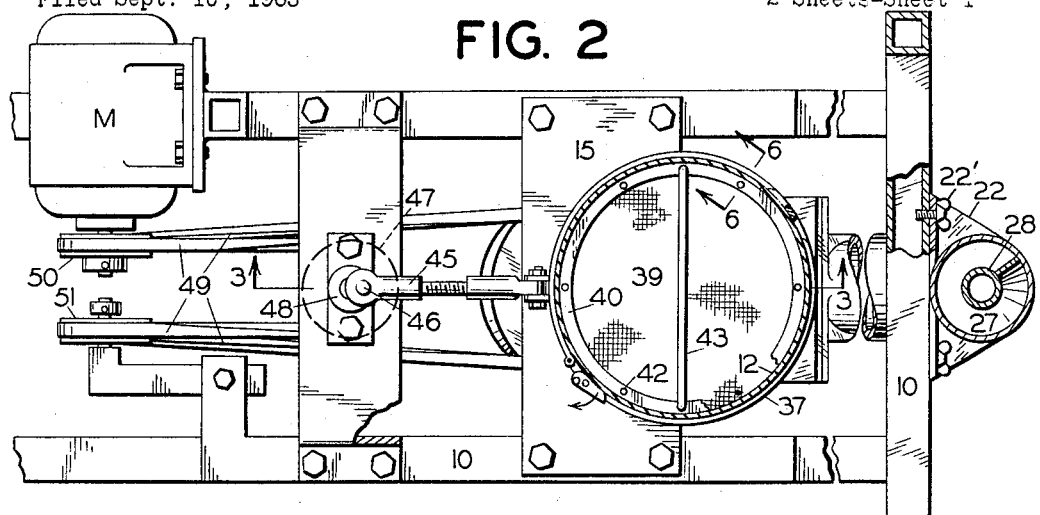
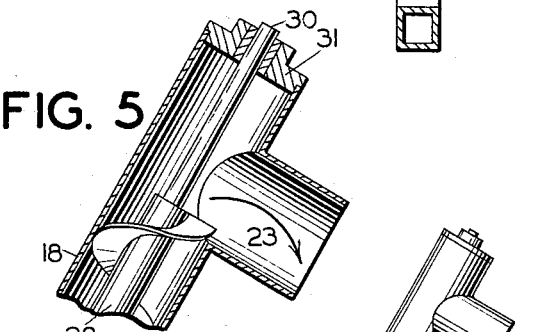
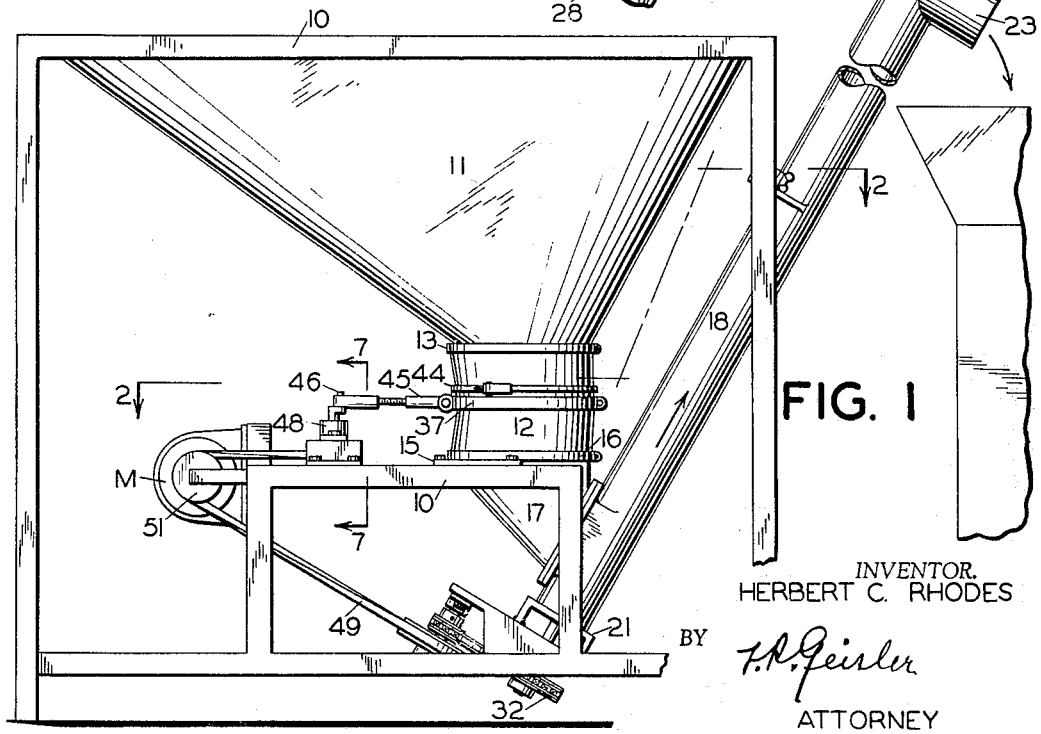
INVENTOR.
HERBERT C. RHODES
BY
*F. R. Geisler*
ATTORNEY INVENTOR.
HERBERT C. RHODES
BY
*T. R. Geisler*
ATTORNEY

United States Patent Office 3,288,287
Patented Nov. 29, 1966

3,288,287
SIFTER AND LIFTER FOR FLOUR AND THE LIKE
Herbert C. Rhodes, 10106 SE. Stark St.,
Portland, Oreg.
Filed Sept. 10, 1963, Ser. No. 307,849
7 Claims. (Cl. 209—236)

This invention relates in general to mechanically operated sifters and conveyors for material in pulverized or powdered form, and, more specifically, relates to sifters for flour and other ingredients for dough products produced on a large scale in commercial bakeries.

The general object of the invention is to provide an improved device for sifting flour and for conveying the sifted flour to an elevated height for transfer to the next station in the dough-preparing process in the bakery.

One of the recognized problems in connection with flour sifters in commercial bakeries is the difficulty of keeping such devices in proper clean condition in compliance with the strict sanitary regulations imposed on bakeries in most localities, since the nature of the finely powdered flour makes the thorough cleaning of vessels in which flour is handled more difficult or tedious than in the case of other substances. Also, as is well known, the fine screen in a flour sifter easily becomes clogged in use and must be cleaned or cleared frequently. A special object of the invention accordingly is to provide a novel flour sifter and elevator which can easily be disassembled for thorough and complete cleaning and then easily reassembled for further operation, and, in particular, a sifter from which the sifting screen can easily be removed.

A related object is to provide a novel device for the purpose mentioned which will be simple and practical in construction and which will not present any speical maintenance problem.

The manner in which these objects and other advantages are attained with the device of the present invention, and the construction and operation of various parts of the device, will be briefly explained and described with reference to the accompanying drawings, wherein:

FIG. 1 is a side elevation showing the device in operating position;

FIG. 2 is a staggered plan section taken on the line indicated at 2—2 of FIG. 1 and drawn to a larger scale;

FIG. 5 is a fragmentary sectional elevation of the top or discharging end of the lifter;

Figure 4:
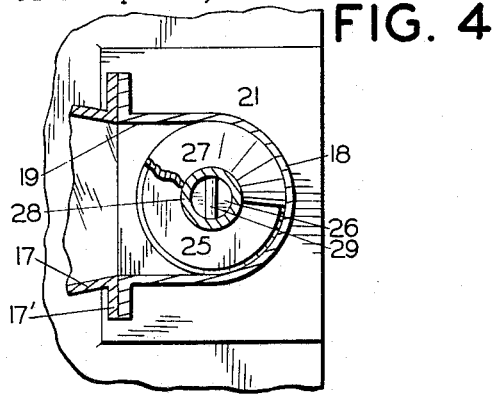
FIG. 4 is a fragmentary transverse section on line 4—4 of FIG. 3.

Referring first to FIG. 1, the device includes a main frame 10 which supports a hopper 11 into which the flour and other ingredients are dumped in order to be sifted and from which they are to be conveyed to a higher level after sifting. A cylindrical sleeve 12 (see also FIG. 3) of heavy flexible rubber, or other similar suitably flexible material, has its upper end fitted over the annular downwardly-extending flange 11' which consitutes the discharging mouth of the hopper 11. The upper end of this flexible sleeve 12 is firmly clamped onto the hopper flange 11' by a removable metal clamping band 13 adapted to be held in place by a suitable clamping bolt.

A housing 17 (FIG. 3) has a circular open top of approximately the same diameter as the bottom flange 11' of the hopper outlet. The top of the housing is spaced a distance below the hopper outlet and is in axial alignment with it. A horizontal plate 15, integral with the housing 17, extends halfway around the outside of the circular top of the housing. This plate 15 is secured to the main frame 10 and supports the housing 17 in stationary position. The flexible sleeve 12 is of the proper length to extend from the bottom opening of the hopper to the top opening of the housing 17 and the bottom end of the sleeve 12 is securely clamped on the top of the housing 17 by a similar metal clamping band 16.

Figure 3:
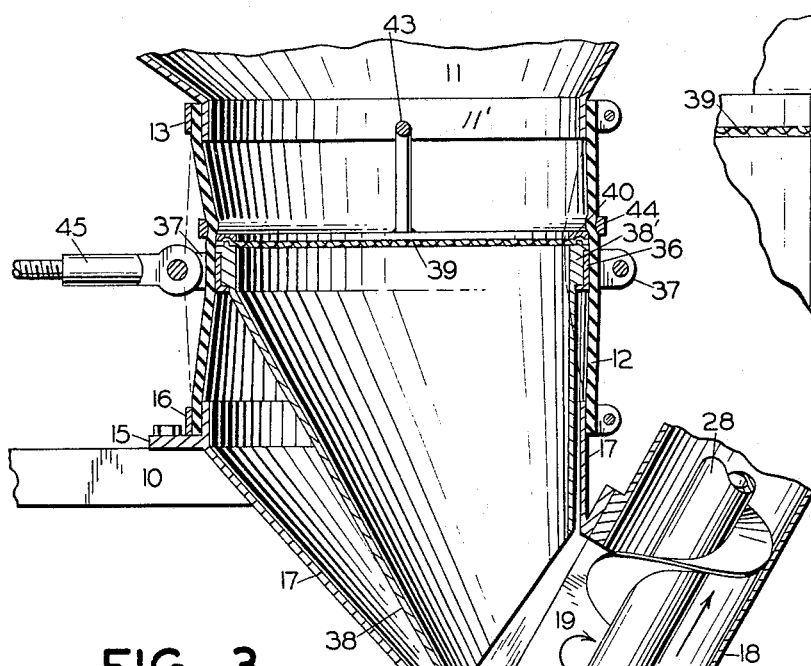
FIG. 3 is a fragmentary sectional elevation of the main operating portion of the device drawn to a still larger scale, this section being taken on line 3—3 of FIG. 2.

The housing 17 is shaped as shown in FIG. 3 with the diameter decreasing downwardly, and terminates in an annular flange 17', the axis of which is oblique to the axis of the top opening in the housing while extending along in the same vertical plane as the axis of the top opening.

A conveyor tube 18 (FIGS. 1, 3, 4, and 5) is so mounted on the device that its axis extends parallel to the bottom flange 17' of the connecting housing 17, and this conveyor tube 18 is formed with a built-up side inlet opening 19 extending in the same plane as the bottom flange 17' of the connecting housing 17 and of the same internal diameter as the bottom flange 17'. The conveyor tube is so mounted that this inlet opening will be in registration with the bottom of the connecting housing 17, as shown best in FIG. 3.

The bottom end 18' (FIG. 3) of the conveyor tube 18 is removably supported on an annular shoulder 20 extending from a housing 21, which housing is rigidly mounted on a supporting bracket arm in the bottom portion of the main frame 10. A bracket flange 22 (FIG. 2) on the conveyor tube 18 is removably secured to a cross bar of the main frame 10 by wing nuts 22'. Thus the conveyor tube 18 may quickly and easily be removed from the device and quickly and easily set back into place. The conveyor has a discharging spout 23 (FIGS. 1 and 5) near the top.

The housing 21 (FIG. 3) has suitable bearing mountings for a driven shaft 24, which shaft is co-axial with the shoulder 20 on the housing 21 and thus with the conveyor tube 18. An integral disc 25 at the top of the driven shaft 24 carries a co-axial lug 26 formed with a transverse slot. A screw conveyor 27 has a tubular shaft 28, the bottom end of which slips in place over the lug 26, and a cross pin 29 in the bottom of the shaft 28, by engagement with the slot in the lug 26, causes the screw conveyor 27 to be rotated by the driven shaft 24 when the conveyor tube 18 and screw conveyor 27 are set in place. The top end of the conveyor shaft 28 is formed with an axially aligned stub shaft 30 (FIG. 5) which is slidably and rotatably mounted in bearings in the closed top 31 of the conveyor tube 18. A sprocket 32 (FIG. 3), secured on the bottom end of the shaft 24, is connected with a sprocket 33 on the stub shaft 34 which also carries a pulley 35 which is driven by belt connection from a motor M (FIG. 1).

Figure 6:
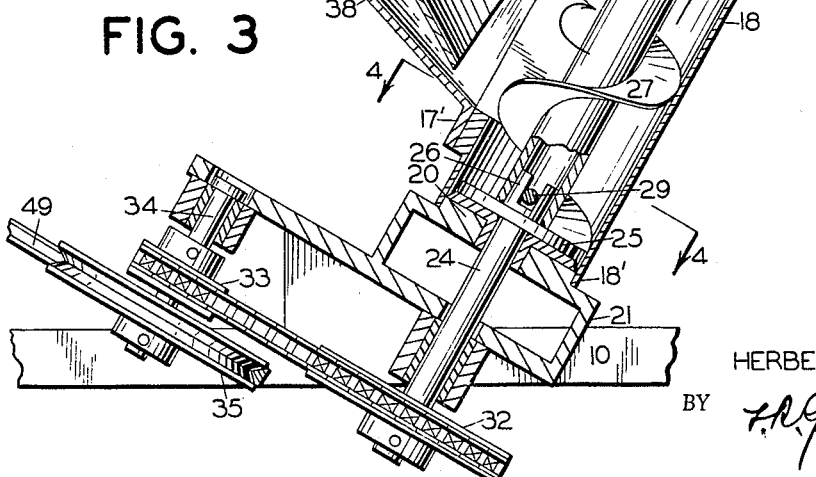
FIG. 6 is a fragmentary section on line 6—6 of FIG. 2 drawn to a much larger scale for clarity.

A ring 36 (FIGS. 3 and 6), having an external diameter almost equal to the interior diameter of the bottom flange 11' of the hopper 11, is placed inside the rubber sleeve 12 approximately half-way between the top and bottom of the sleeve 12, and is firmly secured to the sleeve by an outside clamping band 37. The ring 36 has an inwardly extending bottom flange 36' (FIG. 6). The top rim portion 38' of a guide funnel 38 is removably supported on the ring 36, as shown in FIGS. 3 and 6. A sifting screen 39 is removably supported on the top rim 38' of the guide funnel 38. The bottom of the guide funnel 38 terminates near the bottom of the housing member 17, and thus near the inlet opening into the conveyor tube 18, and the bottom of the guide funnel 38 is spaced from the inside of the wall of the surrounding housing member 17.

The sifting screen 39 is surmounted by a circular metal frame 40 (FIGS. 2, 3 and 6). The frame 40 has an annular recess 40' in its bottom face which fits down over an annular rib 41 in the top face of the rim 38' of the guide funnel 38. When the screen is set in place on the rim 38' the frame 40 is fastened down on the rim 38' and screen edge by suitable screws 42 thus causing the screen 39 to be tightly clamped between the frame 40 and the rim 38'. The frame 40 is provided with a loop handle 43 by means of which the screen assembly and the guide funnel 38 can be lifted entirely out of the device. A key lug 52 (FIG. 6) on the ring 36 engages a slot in the rim 38' and prevents any rotation of the guide funnel 38 with respect to the supporting ring 36. In order to hold the screen and the guide funnel 38 firmly down on the supporting ring 36 during the operation of the device an additional clamping band 44 (FIGS. 1, 3 and 6) is placed around the outside of the rubber sleeve 12 immediately above the screen frame and is tightened sufficiently to cause the sleeve 12 to be pressed inwardly slightly.

Figure 7:
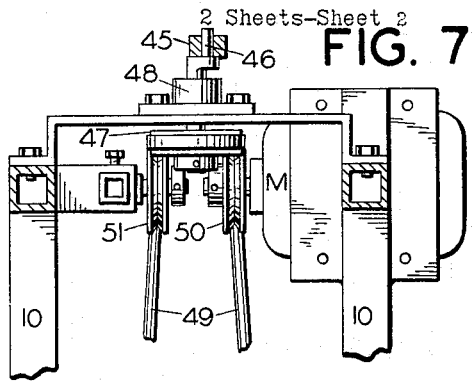
FIG. 7 is a sectional elevation on line 7—7 of FIG. 1 drawn to the same scale as FIG. 2.

An adjustable link assembly 45 (FIGS. 1, 2, 3 and 7), having one end pivotally connected to the clamping band 37, has its other end connected to a crank 46 on the top end of the vertical stub shaft to which a belt pulley 47 (FIG. 7) is secured. The stub shaft and belt pulley 47 are mounted in a suitable bearing housing 48 which in turn is supported on a plate mounted on the main frame 10. An endless driving belt 49 passes around a drive pulley 50 of the motor M (FIG. 2), then passes around the pulley 47 (FIG. 7), thence over an idler pulley 51, then down around the pulley 35 (FIG. 3) and finally back to the drive pulley 50.

As evident, the operation of the motor M, by causing rotation of the pulley 47, produces rapid vibration of the screen 39, and simultaneously, by rotating the pulley 35, with which the drive shaft 24 (FIG. 3) for the screen conveyor 27 is connected through suitable reduction, produces rotation of the screw conveyor 27.

Thus with the operation of the device the flour and other dough ingredients, which are dumped into the hopper 11 are sifted through the screen during the rapid vibration of the screen and the sifted material passes down and into the conveyor tube 18 in which it is conveyed by the screw conveyor to the upper discharging outlet of the conveyor tube. When thorough cleaning of the device is required the loosening of the clamping band 44 enables the screen and guide funnel 38 to be lifted out, as previously mentioned. The unfastening of the wing nuts 22' enables the conveyor tube 18 to be removed and with it the screw conveyor 27, and the latter is easily slid out of the conveyor tube. Thus the disassembling and the reassembling of the entire device requires very little time and labor and a thorough cleaning of the device and its proper maintenance do not involve any difficulty or problem.

I claim:

1. In a sifter for flour and the like, a stationary hopper having a bottom outlet located in a horizontal plane, a stationary housing below said hopper, said housing having a top opening of substantially the same size as said hopper outlet extending in a horizontal plane and spaced below said hopper outlet and in vertical registration therewith, a sleeve of flexible material connecting said hopper outlet and said housing top opening, means removably securing the top of said sleeve to said hopper outlet, means removably securing the bottom of said sleeve to said housing top opening, a sifting screen positioned in said sleeve substantially midway between the top and bottom of said sleeve, and extending in a horizontal plane over the interior of said sleeve, means for removably securing said screen in place in the central portion of said sleeve, a vibrating mechanism outside of said sleeve, and means connecting said vibrating mechanism with said central portion of said sleeve and with said means for securing said screen in said sleeve, whereby said central portion of said sleeve and therewith said screen will be oscillated in the horizontal plane while the upper and lower portions of said sleeve remain stationary.

2. In a sifter for flour and the like, a stationary hopper having a bottom circular outlet located in a horizontal plane, a stationary housing below said hopper, said housing having a top circular opening of substantially the same size as said hopper outlet spaced below said hopper outlet and in vertical registration therewith, a sleeve of flexible material connecting said hopper outlet and said housing top, a clamping band removably securing the top of said sleeve to said hopper outlet, a similar clamping band removably securing the bottom of said sleeve to said housing top opening, a sifting screen positioned in said sleeve substantially midway between said hopper outlet and said housing top opening and extending in a horizontal plane over the interior of said sleeve, a supporting ring in said sleeve for said screen, a clamping band extending around said sleeve and securing said ring in place by clamping said sleeve tightly against said ring, and a screen vibrating mechanism outside of said sleeve connected with said last mentioned clamping band.

3. In a device of the character described for flour, a stationary hopper having a bottom outlet located in a horizontal plane, a stationary housing below said hopper, said housing having a top opening of substantially the same shape and size as said hopper outlet and extending in a horizontal plane spaced below said hopper outlet and in vertical registration therewith, said housing having a bottom opening, a sleeve of rubber connecting said hopper outlet and said housing top opening, means removably securing the top of said sleeve to said hopper outlet, similar means removably securing the bottom of said sleeve to said housing top opening, a sifting screen positioned in said sleeve and extending in a horizontal plane over the interior of said sleeve, a ring mounted in said sleeve substantially midway between the top and bottom of said sleeve, a clamping band extending around said sleeve and securing said ring in place by clamping said sleeve tightly against said ring, a guide funnel having a top rim portion, said top rim portion and said screen supported by said ring, said guide funnel extending down through the lower portion of said sleeve and through said stationary housing spaced from the wall of said housing and terminating near said bottom opening in said housing, and a vibrating mechanism connected with said clamping band.

4. In a sifter and lifter for flour and the like, a stationary hopper having a bottom outlet located in a horizontal plane, a stationary housing below said hopper, said housing having a top opening of substantially the same shape and size as said hopper outlet extending in a horizontal plane spaced below said hopper outlet and in vertical registration therewith, said housing having a bottom opening located in a plane oblique to the plane of said housing top opening, a sleeve of flexible material connecting said hopper outlet and said housing top opening, means removably securing the top of said sleeve to said hopper outlet, means removably securing the bottom of said sleeve to said housing top opening, a sifting screen positioned in said sleeve between said hopper outlet and said housing top opening and extending in a horizontal plane over the interior of said sleeve, a supporting ring in said sleeve for said screen, a clamping band extending around said sleeve and securing said ring in place by clamping said sleeve tightly against said ring, a screen vibrating mechanism outside of said sleeve connected with said clamping band, a conveyor tube extending obliquely upwardly from the bottom of said housing, means for removably mounting said conveyor tube, said conveyor tube having an intake opening registering with said bottom opening of said housing when said conveyor tube is in place, a screw conveyor removably mounted in said conveyor tube for conveying material from said intake opening upwardly through said tube, a discharging spout in the upper portion of said conveyor tube, and means for rotating said screw conveyor.

5. A sifter and lifter for flour and the like including a stationary hopper having a bottom outlet located in a horizontal plane, a stationary housing below said hopper, said housing having a top opening of substantially the same size as said hopper outlet extending in a horizontal plane spaced below said hopper outlet and in vertical registration therewith, said housing having a bottom opening located in a plane oblique to the plane of said housing top opening, a sleeve of rubber connecting said hopper outlet and said housing top opening, a clamping band removably securing the top of said sleeve to said hopper outlet, a clamping band removably securing the bottom of said sleeve to said housing top opening, a sifting screen positioned in said sleeve substantially midway between the top and bottom of said sleeve and extending in a horizontal plane over the interior of said sleeve, means for supporting said screen in place in said sleeve, a screen vibrating mechanism outside of said sleeve connected with said supporting means for said screen, a conveyor tube extending obliquely upwardly from beneath said housing, the axis of said tube extending in a plane parallel to the plane of said bottom opening in said housing, said conveyor tube having an intake opening registered with said bottom opening in said housing when said conveyor tube is in place, a stationary support for the bottom end of said tube, said tube removably resting on said support, means for removably securing said tube in position, a screw conveyor removably mounted in said tube, a driving shaft for said screw conveyor rotatably mounted in said support, means for removably connecting said screw conveyor with said driving shaft, and motor driven means for rotating said driving shaft for said screw conveyor and for operating said vibrating mechanism.

6. In a device of the character described, a stationary hopper having a bottom circular outlet located in a horizontal plane, a stationary housing below said hopper, said housing having a top circular opening of substantially the same size as said hopper outlet and extending in a horizontal plane spaced below said hopper outlet and in vertical registration therewith, said housing having a bottom opening located in a plane oblique to the plane of said housing top opening, a sleeve of flexible material connecting said hopper outlet and said housing top opening, means removably securing the top of said sleeve to said hopper outlet, means removably securing the bottom of said sleeve to said housing top opening, a sifting screen positioned in said sleeve between the top and bottom of said sleeve and extending in a horizontal plane over the interior of said sleeve, a supporting ring in said sleeve, a clamping band extending around said sleeve and securing said ring in place in said sleeve by clamping said sleeve tightly against said ring, a vibrating mechanism outside of said sleeve connected with said supporting ring, a guide funnel having a top rim portion, said top rim portion and said screen supported on said ring, said guide funnel extending down through the lower portion of said sleeve and through said stationary housing spaced from the walls of said housing and terminating within the bottom opening in said housing, a conveyor tube extending obliquely upwardly from beneath said housing, the axis of said tube extending in a plane parallel to the plane of said bottom opening in said housing, said conveyor tube having an intake opening registering with said bottom opening in said housing when said conveyor tube is in place, a stationary support for the bottom of said tube, said tube removably resting on said support, means for removably securing said tube in position, a screw conveyor removably resting on said support, means for removably securing said tube in position, a screw conveyor removably mounted in said tube, a driving shaft for said screw conveyor rotatably mounted in said support, means for removably connecting said screw conveyor with said driving shaft, and means for rotating said driving shaft for said screw conveyor.

7. A sifter and lifter for flour and the like including a stationary hopper having a bottom circular outlet located in a horizontal plane, a stationary housing below said hopper, said housing having a top circular opening of substantially the same size as said hopper outlet extending in a horizontal plane spaced below said hopper outlet and in vertical registration therewith, said housing having a bottom opening located in a plane oblique to the plane of said housing top opening, a sleeve of rubber connecting said hopper outlet and said housing top opening, a clamping band removably securing the top of said sleeve to said hopper outlet, a clamping band removably securing the bottom of said sleeve to said housing top opening, a sifting screen positioned in said sleeve substantially midway between said hopper outlet and said housing top opening and extending in a horizontal plane over the interior of said sleeve, a supporting ring in said sleeve, a clamping band extending around said sleeve and securing said supporting ring in place by clamping said sleeve tightly against said ring, a vibrating mechanism outside of said sleeve connected with said last mentioned clamping band, a guide funnel having a top rim portion, said top rim portion and said screen supported by said ring, said guide funnel extending down through the lower portion of said sleeve and through said stationary housing spaced from the walls of said housing and terminating near said bottom opening in said housing, a conveyor tube extending obliquely upwardly from the bottom of said housing, means for removably mounting said conveyor tube, said conveyor tube having an intake opening registering with said bottom opening of said housing when said conveyor tube is in place, a screw conveyor removably mounted in said conveyor tube for conveying material from said intake opening upwardly through said tube, a discharging spout in the upper portion of said conveyor tube, a motor, and means connecting said motor with said screw conveyor and with said vibrating mechanism.

References Cited by the Examiner
UNITED STATES PATENTS

| 2,065,079 | 12/1936 | Lauterbur | 209—240 |
| 2,591,688 | 4/1953 | Faulkner | 209—236 |

FOREIGN PATENTS

| 5,447 | 1886 | Great Britain. |

HARRY B. THORNTON, *Primary Examiner.*

FANK W. LUTTER, *Examiner.*

L. H. EATHERTON, *Assistant Examiner.*